United States Patent
Yang et al.

(10) Patent No.: US 10,251,139 B2
(45) Date of Patent: Apr. 2, 2019

(54) ACTIVE USER SELECTION IN MASSIVE MIMO

(71) Applicant: Nokia Technologies OY, Espoo (FI)

(72) Inventors: Hong Yang, Ledgewood, NJ (US); Thomas L. Marzetta, Summit, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 107 days.

(21) Appl. No.: 15/609,751

(22) Filed: May 31, 2017

(65) Prior Publication Data

US 2018/0352523 A1     Dec. 6, 2018

(51) Int. Cl.
  *H04W 8/00*     (2009.01)
  *H04W 56/00*    (2009.01)
  *H04B 7/0413*   (2017.01)
  *H04W 72/04*    (2009.01)

(52) U.S. Cl.
  CPC ...... *H04W 56/0005* (2013.01); *H04B 7/0413* (2013.01); *H04W 8/005* (2013.01); *H04W 72/0446* (2013.01)

(58) Field of Classification Search
  CPC ............. H04W 56/0005; H04W 8/005; H04W 72/0446; H04B 7/0413
  See application file for complete search history.

(56) References Cited

U.S. PATENT DOCUMENTS

| | | |
|---|---|---|
| 2013/0070621 A1 | 3/2013 | Marzetta et al. |
| 2014/0314006 A1 | 10/2014 | Suh et al. |

OTHER PUBLICATIONS

International Search Report and Written Opinion dated Sep. 17, 2018, in connection with International Patent Application No. PCT/US2018/030592, 10 pgs.

Marzetta, Thomas L., "Noncooperative Cellular Wireless with Unlimited Numbers of Base Station Antennas," IEEE Transactions on Wireless Communications, vol. 9, No. 11, Nov. 2010, pp. 3590-3600.

Ngo, Hien, Quoc et al., "Aspects of Favorable Propagation in Massive MIMO," Proceedings of the 22nd European Signal Processing Conference, Sep. 2014, 5 pages.

(Continued)

*Primary Examiner* — Michelle M Koeth
(74) *Attorney, Agent, or Firm* — Chiesa Shahinian & Giantomasi PC

(57) ABSTRACT

A first channel correlation is calculated for each pair of access terminals in a population of access terminals. A particular pair of access terminals is identified from the population of access terminals based on the first channel correlations. The population of access terminals includes a first access terminal of the particular pair of access terminals, a second access terminal of the particular pair of access terminals, and at least one remaining access terminal from the population of access terminals. A second channel correlation is calculated between the first access terminal and each of the at least one remaining access terminal. A third channel correlation is calculated between the second access terminal and each of the at least one remaining access terminal. One of the first access terminal and the second access terminal is selected to drop from service based on the second channel correlations and the third channel correlations.

20 Claims, 6 Drawing Sheets

(56) References Cited

OTHER PUBLICATIONS

Sayeed, Akbar M., "Deconstructing Multiantenna Fading Channels," IEEE Transations in Signal Processing, vol. 50, No. 10, Oct. 2002, pp. 2563-2579.

Marsaglia, George, "Choosing a Point From the Surface of a Sphere," The Annals of Mathematical Statistics 1972, vol. 43, No. 2, pp. 645-646.

ACTIVE USER SELECTION IN MASSIVE MIMO

FIELD OF THE INVENTION

The described invention relates to wireless communication systems, and more particularly to active user selection in massive multiple-input multiple-output wireless systems.

BACKGROUND OF THE INVENTION

In Massive MIMO (multiple-input multiple-output) systems, base stations are equipped with a very large number (e.g., hundreds or thousands) of service antennas to simultaneously serve a number (e.g., tens or hundreds) of access terminals. Massive MIMO systems offer most of the benefits of traditional MIMO systems, but at a larger scale. In particular, Massive MIMO systems can provide high throughput, communication reliability, and high power efficiency with linear processing.

In conventional Massive MIMO systems, some access terminals may have similar channel vectors (e.g., due to being geographically close to each other), which may result in significant degradation in throughput for all access terminals. This is particularly true when max-min power control is employed. Max-min power control aims to maximize the minimum throughput, which effectively equalizes the throughput for all access terminals. The practical effect of such max-min power control is that the performance of the best performing access terminals are reduced in order to improve the performance of the worst performing access terminals. It has been shown that uniformly good service to all access terminals may be provided by selectively dropping a number of access terminals.

In order to determine which access terminals to drop, a conventional exhaustive search may theoretically be performed based on a calculated signal-to-interference-plus-noise ratio (SINR). However, this conventional exhaustive search is not practical because the decision of which access terminals to drop must be determined within a coherence interval, which is typically 1 to 2 milliseconds and the required calculations can be very complicated. For a large number of access terminals, the conventional search is impossible.

SUMMARY

In accordance with one or more embodiments, systems and methods for selecting an access terminal to drop from service from a population of access terminals is disclosed. A first channel correlation is calculated for each pair of access terminals in a population of access terminals. A particular pair of access terminals is identified from the population of access terminals based on the first channel correlations. The population of access terminals includes a first access terminal of the particular pair of access terminals, a second access terminal of the particular pair of access terminals, and at least one remaining access terminal from the population of access terminals. A second channel correlation is calculated between the first access terminal and each of the at least one remaining access terminal. A third channel correlation is calculated between the second access terminal and each of the at least one remaining access terminal. One of the first access terminal and the second access terminal is selected to drop from the population of access terminals based on the second channel correlations and the third channel correlations.

In one embodiment, in response to selecting which one of the first access terminal and the second access terminal to drop from the population of access terminals, the respective correlation for the particular pair of access terminals is removed from the first channel correlations to provide updated first channel correlations. For example, the correlation between the particular pair of access terminals may be set to zero. The steps of identifying, calculating the second channel correlation, calculating the third channel correlation, selecting, and removing are repeated for the updated first channel correlations until a maximum correlation of the updated first channel correlations satisfies a threshold.

In one embodiment, selecting which one of the first access terminal and the second access terminal to drop from the population of access terminals includes selecting the first access terminal where a maximum correlation of the second channel correlations is greater than a maximum correlation of the third channel correlations and selecting the second access terminal where a maximum correlation of the third channel correlations is greater than a maximum correlation of the second channel correlations.

In one embodiment, the particular pair of access terminals is identified as the access terminals of the population of access terminals having a highest correlation of the first channel correlations.

In one embodiment, calculating the first channel correlation for each pair of access terminals in the population of access terminals includes, for each respective access terminal in the population of access terminals, calculating the first channel correlation between the respective access terminal and each other access terminal in the population of access terminals. The first channel correlations include correlations between channel vectors associated with access terminals in each pair of access terminals.

In one embodiment, the selected one of the first access terminal and the second access terminal is dropped from service from the population of access terminals by reallocating the selected one of the first access terminal and the second access terminal to a different coherence time slot.

These and other advantages of the present disclosure will be apparent to those of ordinary skill in the art by reference to the following Detailed Description and the accompanying drawings.

DETAILED DESCRIPTION

Figure 1:
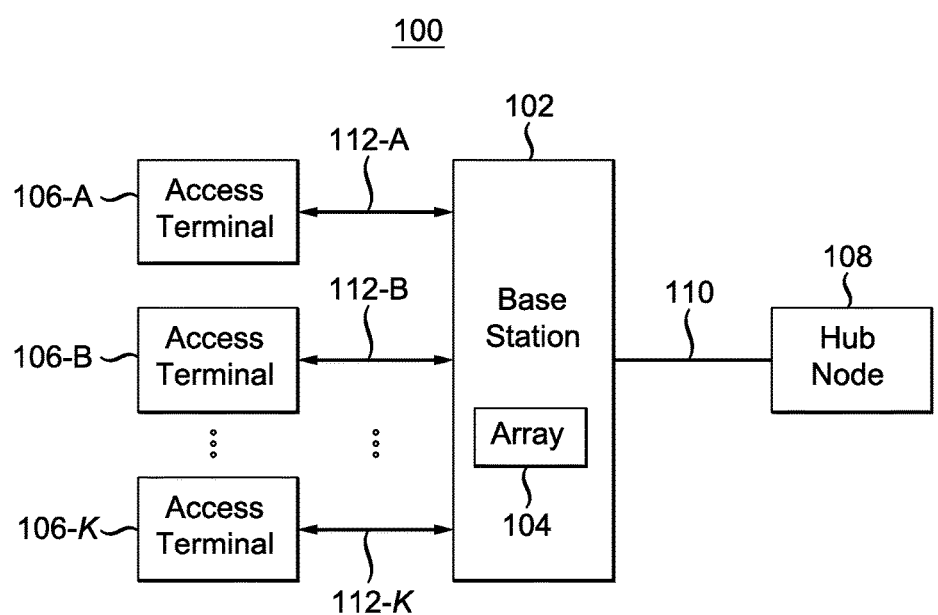
FIG. 1 shows a high-level diagram of a communications system, in accordance with one embodiment.

FIG. 1 shows a high-level overview of a wireless communications system 100, in accordance with one or more embodiments. In one embodiment, communications system 100 is a Massive MIMO system in a line of sight (LOS) propagation environment, however any suitable communications system employing any suitable propagation environment may be employed (e.g., iid Rayleigh propagation environment). Communications system 100 includes a base station 102 simultaneously serving a population of K users or access terminals 106-A, 106-B, ..., 106-K (collectively referred to as access terminals 106). Access terminals 106 communicate with base station 102 via a respective propagation channel 112-A, 112-B, ..., 112-K (collectively referred to as propagation channels 112). Access terminals 106 may be randomly located over a large geographical area, such as, e.g., a city. While communications system 100 is illustratively shown as a single cell system with base station 102, it should be understood that communications system 100 may include any number of base stations simultaneously serving the K access terminals 106 and that the principles discussed herein may be applied to any or all of those base stations.

Base station 102 may be connected other base stations (not shown) and to hub node 108 via backhaul network 110. While backhaul network 110 may typically be a fixed, landline network, such as, e.g., a fiber optic network, backhaul network 110 may be any suitable communications network. For example, backhaul network 110 may be a wireless network.

Base station 102 is equipped with an array of service antennas 104. Array of service antennas 104 may include any number M (e.g., tens or hundreds) of service antennas. For example, array of service antennas 104 may be a single antenna element or an array of a plurality of antenna elements. In some embodiments, array of service antennas 104 may be a one-dimensional linear array of service antennas or a two-dimensional array of service antennas.

In one embodiment, the transmission from base station 102 to access terminals 106 (i.e., downlink transmission) and the transmission from access terminals 106 to base station 102 (i.e., uplink transmission) proceed following time division duplex (TDD) communication protocols. Such communication in accordance with TDD communication protocols may be performed using the method described in U.S. patent application Ser. No. 13/238,329, entitled "System and Method of Wireless Communication using Large-Scale Antenna Networks," which is incorporated herein by reference in its entirety.

In accordance with TDD communication protocols, the downlink and uplink channels are separated in time but use the same frequencies. By reciprocity then, the channel estimates for each downlink channel may be taken as equal to the estimates for the corresponding uplink channel. Any channel estimate will be valid only within a coherence interval. The coherence interval depends on the fading characteristics of the particular network of interest. In typical mobile networks, the coherence interval is approximately the time for an access terminal 106 to travel a distance of one-fourth the operating wavelength.

In accordance with TDD communication protocols, all K access terminals 106 synchronously and simultaneously transmit their uplink signals to base station 102 over their respective propagation channel 112. All K access terminals 106 synchronously and simultaneously transmit pilot sequences to base station 102 over their respective propagation channel 112. Accordingly, a complex-valued channel coefficient vector $g_k$ is defined between base station 102 and each access terminal 106. Base station 102 uses the channel vector $g_k$ to decode the uplink signals that were previously sent by the access terminals 106. Base station 102 also uses the channel vector $g_k$ to form a signal that comprises the data intended for all K access terminals 106.

The channel vector $g_k$ between the kth access terminal 106 and the array of M service antennas 104 is modeled by:

$$g_k = \sqrt{\beta_k} z_k, \quad k=1, \ldots, K,$$

where $\beta_k$ models slow fading and $z_k$ is the M-dimensional column vector. $z_k$ is defined in Equation 1 as follows:

$$z_k = e^{i\phi_k}\left[1 \quad e^{-i\frac{2\pi}{\lambda}\Delta_k^{(2)}} \quad \ldots \quad e^{-i\frac{2\pi}{\lambda}\Delta_k^{(M)}}\right]^T \in \mathbb{C}^M, \quad \text{(Equation 1)}$$

where superscript T denotes the matrix transpose, $\lambda$ is the carrier wavelength, $\phi_k$ models the phase shift associated with a random range between the array of M service antennas 102 and the kth access terminal 106 and is assumed to be uniformly distributed on $[-\pi,\pi]$, and $\Delta_k^{(m)}$ denotes the distance differential. The distance differential $\Delta_k^{(m)}$ is defined as follows:

$$\Delta_k^{(m)} \triangleq d(k,1) - d(k,m), \quad m=1, \ldots, M$$

where $d(k,m)$ is the distance between the kth access terminal 106 and the mth service antenna in array 104. By definition, $\Delta_k^{(1)}=0$.

$\xi \sim U(S)$ represents a random variable $\xi$ uniformly distributed in a set $S \subset \mathbb{R}^n$. Thus, $\phi_k \sim U[-\pi,\pi]$.

Figure 2:
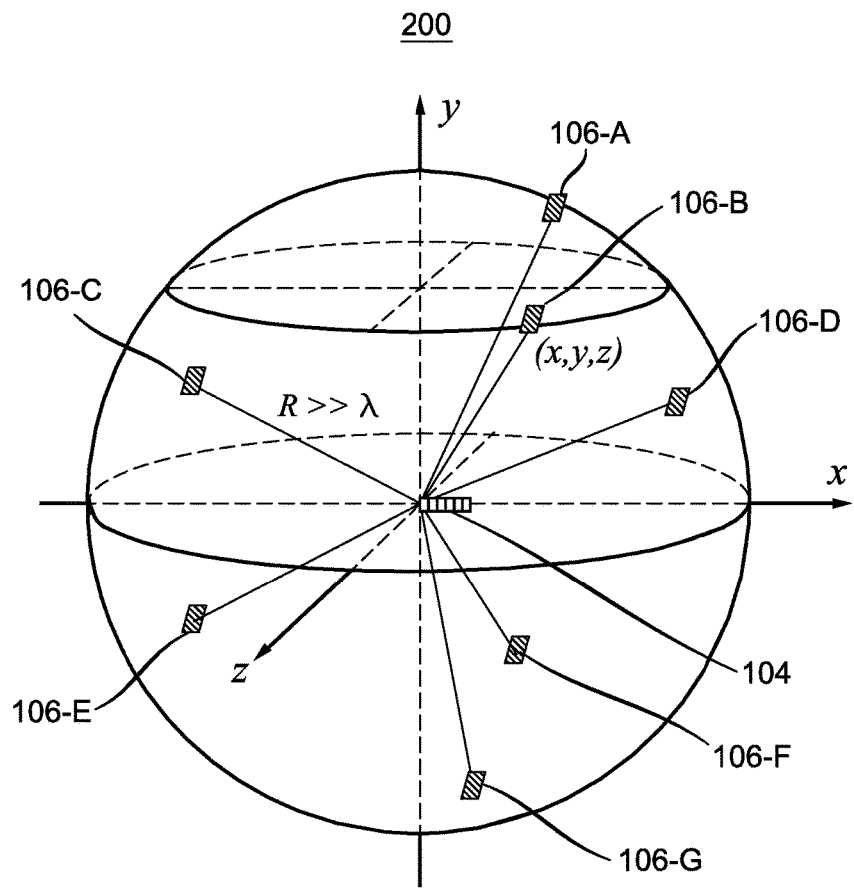
FIG. 2 shows a line of sight propagation model, in accordance with one embodiment.

FIG. 2 illustratively depicts an LOS propagation model 200, in accordance with one or more embodiments. LOS propagation model 200 will be described with reference to FIG. 1. LOS propagation model 200 shows K access terminals 106 (i.e., access terminals 106-A, 106-B, 106-C, 106-D, 106-E, 106-F, and 106-G) randomly distributed on a sphere $S^2(R)$ with radius R and with array of service antennas 104 (at base station 102 in FIG. 1) at its center. While LOS propagation model 200 is shown with a sphere, it should be understood that LOS propagation model may cover any geographic area (e.g., a circle) and is not limited to a sphere.

The coordinates of the kth access terminal 106 is $(x_k, y_k, z_k) \in S^2(R) \triangleq \{u \in \mathbb{R} : \|u\|_2 = R\}$. In accordance with one or more embodiments, LOS propagation model 200 will first be described below with array 104 being a one-dimensional linear array of service antennas and then with array 104 being a two-dimensional array of service antennas.

One-Dimensional Array:

LOS propagation model 200 may be modeled with array 104 as a linear array of service antennas, in accordance with one embodiment. The linear array of M service antennas is placed at the center of the sphere $S^2(R)$. The coordinates of each service antenna is $(x_k, 0, 0,)$, $$x_m = \frac{\lambda}{2}(m-1),$$

$m=1, \ldots, M$ such that the linear array has antenna spacing equal to $$\frac{\lambda}{2}.$$

In the far-field (i.e., when R is much larger than the size of the array, $R \gg M\lambda$), the differential $\Delta^{(m)}$ for a typical access terminal located at $(x,y,z) \in S^2(R)$ can be calculated as $$\Delta^{(m)} = \sqrt{x^2+y^2+z^2} - \sqrt{(x-x_m)^2+y^2+z^2} \approx \frac{x}{R}x_m. \quad \text{(Equation 2)}$$

Noting that the area of the spherical cap is $2\pi Rh$, which is a multiple of its height $h$, results in Lemma 1.

Lemma 1:

For any $R>0$, if $(x,y,z,)\sim U(S^2(R))$, then $x\sim U([-R,R])$.

By symmetry, Lemma 1 also says $y\sim U([-R,R])$ and $z\sim U([-R,R])$. Although individually each of $x$, $y$, and $z$ is uniformly distributed, jointly they must satisfy the relation $x^2+y^2+z^2=R^2$. Thus, they are not independent.

From Equations 1 and 2, for K access terminals 106 uniformly distributed on $S^2(R)$, the channel vector for the kth access terminal 106 is $$z_k = e^{i\phi_k}[1 \; e^{-i\pi v_k} \; \ldots \; e^{-i\pi(M-1)v_k}]^T \in \mathbb{C}^M \quad \text{(Equation 3)}$$

where $v_k = \frac{x}{R} \sim U([-1,1])$.

In accordance with one embodiment, access terminals 106 are assumed to be uniformly distributed on the one-dimensional sphere $S^1(R)$, i.e., a circle with radius $R$. Thus, $$z_k = e^{i\phi_k}[1 e^{-i\pi \sin \theta_k} \ldots e^{-i\pi(M-1)\sin \theta_k}]^T \in \mathbb{C}^M \quad \text{(Equation 4)}$$

where $\theta_k \sim U([-\pi/2, \pi/2])$ is the angle of incidence with respect to the normal direction of the linear antenna array.

Two-Dimensional Array:

LOS propagation model 200 may be modeled with array 104 as a two-dimensional array of service antennas, in accordance with one embodiment. When the position of access terminals 106 is randomized in a two-dimensional manifold, such as $S^2$, one can naturally introduce an additional random variable in the channel vector. Assuming that an $M_1$ by $M_2$ rectangular array of service antennas is located at the center of sphere $S^2(R)$, the coordinates of each service antenna in the array is $(x_m, y_n, 0)$, where $$x_m = \frac{\lambda}{2}(m-1), m=1,\ldots,M_1$$
$$y_n = \frac{\lambda}{2}(n-1), n=1,\ldots,M_2.$$

In the far-field (i.e., when $R$ is much larger than the size of the array, $R\gg M_1\lambda$ and $R\gg M_2\lambda$), the differential $\Delta^{(m,n)}$ of the distances from an access terminal 106 located at $(x,y,z)\in S^2(R)$ to the $(1,1)$th and to the $(m,n)$th service antenna is $$\Delta^{(m,n)} = \sqrt{x^2+y^2+z^2} - \sqrt{(x-x_m)^2+(y-y_n)^2+z^2} \quad \text{(Equation 5)}$$
$$\approx \frac{x}{R}x_m + \frac{y}{R}y_n.$$

From Lemma 1, it is known that $z\sim U([-R,R])$ for $(x,y,z,)\sim U(S^2(R))$. Noting that the set of points on $S^2(R)$ whose z-coordinate equals $uR$ is the circle $S^1(R\sqrt{1-u^2})$. If points are uniformly distributed on the sphere $S^2(R)$, they must also be uniformly distributed on the circle $S^1(R\sqrt{1-u^2})$. Thus, the x-coordinate and the y-coordinate of the points are given by $R\sqrt{1-u^2}\cos\alpha$ and $R\sqrt{1-u^2}\sin\alpha$ respectively, with $\alpha\sim U([0,2\pi])$. This is summarized in Lemma 2.

Lemma 2:

For any $R>0$, if $(x,y,z,)\sim U(S^2(R))$, then $x=\sqrt{1-z^2}\cos\alpha$ and $y=R\sqrt{1-z^2}\sin\alpha$ with $\alpha\sim U([0,2\pi])$.

Noting that the selection of $\alpha$ is independent of $z$, Lemmas 1 and 2 are combined to obtain Theorem 1.

Theorem 1:

For any $R>0$, if $(x,y,z,)\sim U(S^2(R))$, then $x=R\sqrt{1-v^2}\cos\alpha$, $y=R\sqrt{1-v^2}\sin\alpha$, $z=vR$, with $v$ and $\alpha$ independent and $v\sim U([-1,1])$ and $\alpha\sim U([0,2\pi])$.

To generate a uniformly distributed random point on a sphere $S^2$, Theorem 1 requires only two uniform variates.

From Theorem 1, Equation 5 can be written as $$\Delta^{(m,n)} \approx x_m\sqrt{1-v^2}\cos\alpha + y_n\sqrt{1-v^2}\sin\alpha \quad \text{(Equation 6)}$$

Thus, from Equations 1 and 6, the channel vector for the kth access terminal $z_k\in\mathbb{C}^{M_1M_2}$ is given by the entries of the following $M_1\times M_2$ matrix:

$$e^{i\phi_k}\begin{bmatrix} 1 \\ e^{-i\pi\sqrt{1-v_k^2}\cos\alpha_k} \\ \vdots \\ e^{-i\pi(M_1-1)\sqrt{1-v_k^2}\cos\alpha_k} \end{bmatrix} \times \quad \text{(Equation 7)}$$

$$\begin{bmatrix} 1 & e^{-i\pi\sqrt{1-v_k^2}\sin\alpha_k} & \ldots & e^{-i\pi(M_2-1)\sqrt{1-v_k^2}\sin\alpha_k} \end{bmatrix}$$

The three LOS propagation models described above are summarized as follows:

1) $S^1$ one-dimensional model: access terminals 106 randomly located in circle $S^1$ with array 104 arranged as a one-dimensional linear array. The channel vector is given by Equation 4.
2) $S^2$ one-dimensional model: access terminals 106 randomly located in sphere $S^2$ with array 104 arranged as a one-dimensional linear array. The channel vector is given by Equation 3.
3) $S^2$ two-dimensional model: access terminals 106 randomly located in sphere $S^2$ with array 104 arranged as a two-dimensional array. The channel vector is given by entries of the matrix in Equation 7.

It should be understood that the present principles may be applicable to other embodiments of LOS propagation model 200. For example, in one embodiment, access terminals 106 randomly located on a circle $S^1$ with array 104 arranged as a two-dimensional array may also be employed with $\Delta^{(m,n)}$ randomized by only one random variable $a$ when access terminal position is confined to the circle $S^1(R)$.

For all three LOS models described above, it can be seen that $$z^*_k z_k = \|z_k\|_2^2 = M \quad \text{(Equation 8)}$$

where the superscript * denotes the conjugate transpose. And for $l\neq k$:

$$z_l^* z_k = e^{i(\phi_k-\phi_l)}\sum_{m=1}^M e^{i\frac{2\pi}{\lambda}(\Delta_l^{(m)}-\Delta_k^{(m)})} \quad \text{(Equation 9)}$$

Of interest is the extent of correlation between channel vectors for two access terminals. $\gamma_{1,2}$ is the magnitude of the inner product between two normalized channel vectors, where:

$$\gamma_{1,2} \triangleq \frac{|z_1^* z_2|}{\|z_1\|_2 \|z_2\|_2}$$

For simplicity, $\gamma_{1,2}$ will be referred to herein as the correlation between two channel vectors $z_1$ and $z_2$.

Figure 3:
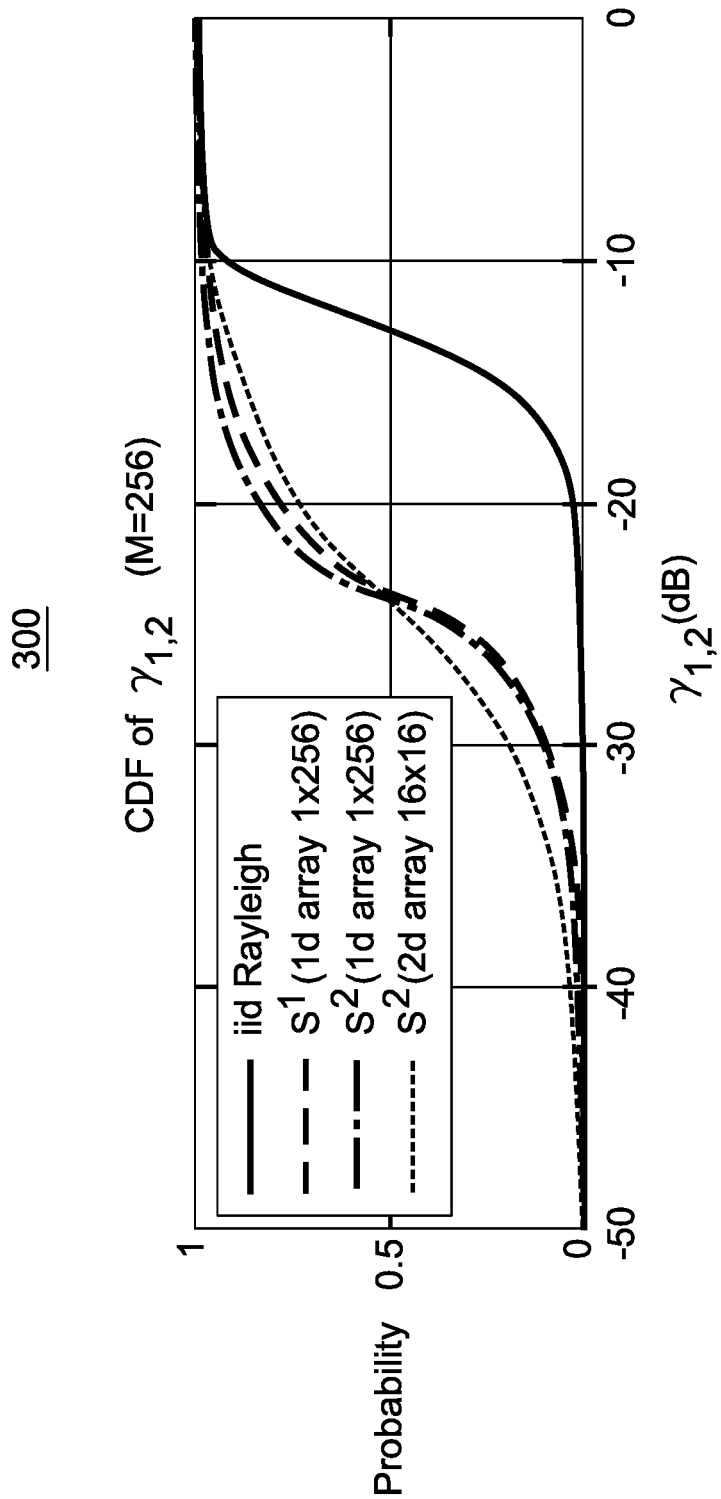
FIG. 3 shows a graph of the cumulative distribution function of the correlation between two channel vectors, in accordance with one embodiment.

FIG. 3 shows a graph 300 of the cumulative distribution function (CDF) of the correlation $\gamma_{1,2}$ between channel vectors $z_1$ and $z_2$ for M=256 service antennas in array 104, in accordance with one embodiment. Graph 300 shows a comparison of the CDF of the correlation between channel vectors of (1) the iid Rayleigh propagation environment, (2) the $S^1$ one-dimensional model where access terminals 106 are randomly located in circle $S^1$ with array 104 arranged as a one-dimensional 1×256 linear array, (3) the $S^2$ one-dimensional model where access terminals 106 are randomly located in sphere $S^2$ with array 104 arranged as a one-dimensional 1×256 linear array, and (4) the $S^2$ two-dimensional model where access terminals 106 are randomly located in sphere $S^2$ with array 104 arranged as a two-dimensional 16×16 array.

As shown in graph 300, most of the time the channel vectors of the three LOS models are more nearly orthogonal than iid Rayleigh channel vectors. Further, the CDF for the three LOS models are similar with the same median, but that the $S^2$ two-dimensional model with a 16×16 array exhibits slightly larger standard deviation.

One might expect to see a further reduction in channel correlation in the $S^2$ two-dimensional model because each channel vector is modeled with additional random variables compared with the one-dimensional model. However, this is a false expectation because many random variables, for example, uniformly distributed random variables, are decomposable into the sum of two or more independent random variables.

Referring back to FIG. 1, communications system 100 comprises a single cell with base station 102 having an array of M service antennas 104, simultaneously serving K access terminals 106. Let $G=[g_1 \ldots g_K] \in \mathbb{C}^{M \times K}$ be the M×K channel matrix between the array of M service antennas 104 at base station 102 and the K access terminals 106.

The downlink data channel is modeled as $$y = \sqrt{\rho_d} G^T x + w \qquad \text{(Equation 10)}$$

where $y \in \mathbb{C}^K$ is the received signal vector at the K access terminals 106, $\rho_d$ is the normalized (with respect to noise power at the mobile receiver) downlink SNR (signal-to-noise ratio), $x \in \mathbb{C}^M$ is the precoded input vector to the ports of the array of M service antennas 104 in base station 102, and w is the noise vector. The downlink power constrain is specified as $E(x^*x) \leq 1$.

Similarly, denoting the corresponding variables with a superscript ', the uplink data channel is modeled as $$y' = \sqrt{\rho_u} G x' + w' \qquad \text{(Equation 11)}$$

where $y' \in \mathbb{C}^K$ is the received signal vector at ports of the array of M service antennas 104 at base station 102, $\rho_u$ is the normalized (with respect to noise power at the base station receiver) uplink SNR, $x' \in \mathbb{C}^K$ is the power controlled message-bearing signal from the K access terminals 106, and w' is the noise vector. Uplink power constraint is specified as $\|E(x'^{*T} \odot x')\|_\infty \leq 1$ where $\odot$ denotes the element-wise multiplication.

Expressions for the downlink and uplink SINR (signal-to-interference-plus-noise ratio) will now be derived for a signal cell Massive MIMO system with MR (Maximal Ratio) processing and ZF (Zero-forcing) processing.

The notion of ergodic capacity is associated with coding over many independent realizations of all sources of randomness, and it allows the channel matrix to be averaged over to obtain capacity expressions. This condition is typically fulfilled in the case of Raleigh fading through the frequency dependence of small-scale fading, and the possibility of performing coding over more than one temporal coherence interval. However, in LOS conditions, ergodic capacity is unobtainable since the random angle of arrival is independent of frequency and may remain substantially constant for a long period of time.

Effective SINR:

Explicit expressions for the effective SINR are derived as follows.

TABLE 1

Maximum Ratio and Zero-forcing expressions for downlink (DL) and uplink (UL).

| | Maximum Ratio | Zero-forcing |
|---|---|---|
| DL | $\dfrac{\|z_k\|_2^2 \rho_d \beta_k \eta_k}{1 + \rho_d \beta_k \sum_{l \neq n} \eta_l \dfrac{\|z_k^* z_l\|^2}{\|z_l\|_2^2}}$ | $\dfrac{\rho_d \beta_k \eta_k}{\sum_{l=1}^{K} [(Z^*Z)^{-1}]_{l,l} \eta_l}$ |
| UL | $\dfrac{\|z_k\|_2^2 \rho_d \beta_k \eta_k}{1 + \dfrac{\rho_u}{\|z_k\|_2^2} \sum_{l \neq n} \beta_l \eta_l |z_k^* z_l|^2}$ | $\dfrac{\rho_u \beta_k \eta_k}{[(Z^*Z)^{-1}]_{k,k}}$ |

Here, $Z \triangleq [z_1 \ldots z_K]$ and $[(Z^*Z)^{-1}]_{l,l}$ denotes the lth diagonal element of $(Z^*Z)^{-1}$, and $\eta \triangleq [\eta_1 \ldots \eta_K]^T$ is the power control. For the downlink, $\eta$ must satisfy the total power constraint $$\eta \in \{s \in \mathbb{R}_+^K : \|s\|_1 \leq 1\} \qquad \text{(Equation 12)}$$

where $\mathbb{R}_+^K$ is the set of K-dimensional non-negative real vectors. For the uplink, the power control $\eta$ must satisfy the individual power constraint $$\eta \in \{s \in \mathbb{R}_+^K : \|s\|_\infty \leq 1\} \qquad \text{(Equation 13)}$$

Max-Min Power Control:

The maximum attainable common SINRs for all K access terminals and the corresponding max-min power controls are obtained.

Max-Min Power Control for MR: From Table 1, it can be seen that for a given SINR, MR downlink and uplink SINR expressions are linear in the power control $\eta$. The maximum attainable downlink and uplink SINRs and the corresponding max-min power controls for MR can be obtained by the bi-section method. For a given SINR=$\zeta$, the downlink SINR expression can be written as $$(I_K - \zeta \Lambda D_{Z^*Z}^{-2}) \eta = \zeta \rho_d^{-1} b_1 \qquad \text{(Equation 14)}$$

where

-continued $$\Lambda = \begin{pmatrix} 0 & |z_1^* z_2|^2 & \cdots & |z_1^* z_K|^2 \\ |z_2^* z_1|^2 & 0 & \cdots & |z_2^* z_K|^2 \\ \vdots & \vdots & \ddots & \vdots \\ |z_K^* z_1|^2 & |z_K^* z_2|^2 & \cdots & 0 \end{pmatrix}$$

$$D_{Z^*Z}^{-2} = \text{diag}(\|z_1\|_2^{-4}, \ldots, \|z_K\|_2^{-4})$$

$$b_1 = (\beta_1^{-1}\|z_1\|_2^{-2} \quad \beta_2^{-1}\|z_2\|_2^{-2} \quad \ldots \quad \beta_K^{-1}\|z_K\|_2^{-2})^T$$

and diag (·) denotes diagonal matrix.

Similarly, the uplink SINR expression can be written as $$(I_K - \zeta \Lambda' D_{Z^*Z}^{-2})\eta = \zeta \rho_u^{-1} b_1 \quad \text{(Equation 15)}$$

with $\Lambda' = \text{diag}(\beta_1^{-1}, \ldots, \beta_K^{-1})\Lambda \text{diag}(\beta_1, \ldots, \beta_K)$.

The max-min SINR and the corresponding power control may be calculated for the downlink using Algorithm 1 as follows.

Algorithm 1:
1) Set $\zeta = S$ and solve Equation 14 for the power control $\eta$.
2) If the obtained power control $\eta$ satisfies the constraint of Equation 12, then optimal SINR>S, otherwise SINR<S.
3) Use the bi-section method to search for the maximum SINR that satisfies the constraint of Equation 12.

The max-min SINR and the corresponding power control for the uplink may be similarly calculated using Equation 15 in step 1 and the power control constraint in Equation 13 in steps 2 and 3 of Algorithm 1.

Let $\{\eta^*_k\}$ denote the max-min power control. For MR downlink, we must have $$\sum_{l=1}^{K} \eta^*_l = 1 \quad \text{(Equation 16)}$$

If $\sum_{l=1}^{K} \eta^*_l < 1$, all of $\eta^*_l$ can be scaled by a factor $\alpha = 1/\sum_{l=1}^{K} \eta^*_l < 1$ so that $\sum_{l=1}^{K} \alpha \eta^*_l = 1$, but for any $k=1, \ldots, K$, $$\frac{M \rho_k \beta_k (\alpha \eta_k)}{1 + \frac{\rho_d \beta_k}{M} \sum_{l \neq k} (\alpha \eta_l) |z_k^* z_l|^2} > \frac{M \rho_d \beta_k (\eta_k)}{1 + \frac{\rho_d \beta_k}{M} \sum_{l \neq k} (\eta_l) |z_k^* z_l|^2} \quad \text{(Equation 17)}$$

The inequality of Equation 17 is true because the function $$f(x) = \frac{ax}{1 + bx}$$

is increasing for $\alpha > 0$, so $f(\alpha) > f(1)$ for $\alpha > 1$.

A similar argument for uplink max-min power control shows that we must have $$\max_l \{\eta^*_l\} = 1 \quad \text{(Equation 18)}$$

Thus, the downlink max-min power controls obtained from Algorithm 1 must satisfy Equation 16, the uplink max-min power control similarly obtained must satisfy Equation 18.

Max-Min Power Control for ZF: From the SINR expressions in Table 1, both downlink and uplink max-min power controls for zero-forcing can be obtained as follows.

For the downlink max-min power control for ZF:

$$\eta^*_k = \frac{a_{zf}}{\beta_k}, k = 1, \ldots, K$$

where $a_{zf}$ is any positive constant that satisfies $a_{zf} \leq 1/\sum_{l=1}^{K} \beta_l^{-1}$, and the corresponding max-min SINR is $$SINR_{Mm}^{d,zf} = \frac{\rho_d}{\sum_{l=1}^{K} [(Z^*Z)^{-1}]_{l,l} \beta_l^{-1}}.$$

For the uplink max-min power control for ZF:

$$\eta^*_k = \frac{\min_l \{\beta_l / [(Z^*Z)^{-1}]_{l,l}\}}{\beta_k / [(Z^*Z)^{-1}]_{k,k}}, k = 1, \ldots, K.$$

The corresponding max-min SINR is $$SINR_{Mm}^{u,zf} = \rho_u \min_l \min_l \{\beta_l / [(Z^*Z)^{-1}]_{l,l}\}.$$

In Massive MIMO systems such as, e.g., communications system 100 of FIG. 1, two or more access terminals 106 that have similar channel vectors may reduce the performance of the entire population of access terminals 106. By dropping one or more access terminals 106 from service, the overall performance of the population of access terminals 106 in communications system 100 may be improved. In accordance with one embodiment, one or more access terminals 106 are selected to be dropped from service from the population of access terminals based on the pair-wise correlation between each of the access terminals 106. As used herein, the term "drop from service" or "dropped from service" refers to rescheduling the selected one or more access terminals 106 to a separate transmission resource. For example, the dropped access terminals may be serviced, e.g., in a separate coherence time slot or a different frequency band.

Figure 4:
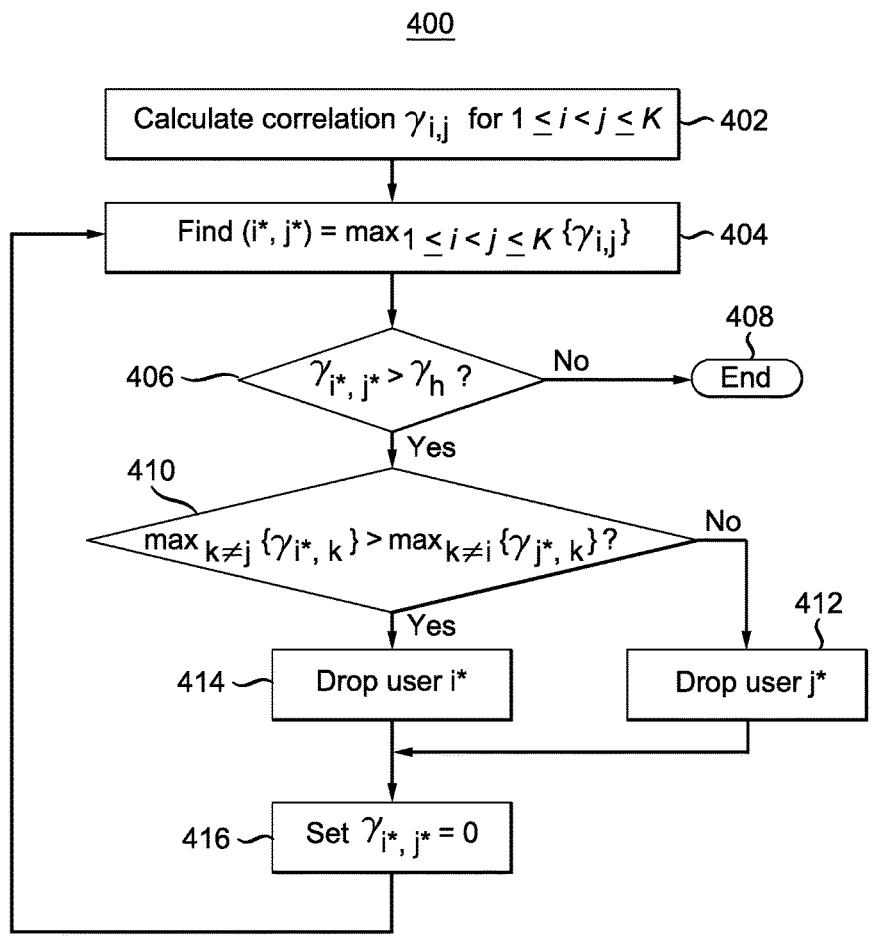
FIG. 4 shows a flow diagram of a method for selecting one or more access terminals to drop from service from a population of access terminals, in accordance with one embodiment.

FIG. 4 shows a method 400 for selecting one or more access terminals to drop from a population of access terminals, in accordance with one or more embodiments. Method 400 may be performed by a base station or any computing device communicatively coupled to the base station.

At step 402, for each pair of any two access terminals i and j in the population of K access terminals 106, a pair-wise channel correlation $\gamma_{i,j}$ is calculated such that $1 \leq i < j \leq K$. For example, in a population of access terminals having access terminals 1 through 10, a pair-wise channel correlation $\gamma_{i,j}$ is determined for access terminal 1 and each of access terminals 2-10, for access terminal 2 and each of access terminals 1 and 3-10, for access terminal 3 and each of access terminals 1-2 and 4-10, etc. The pair-wise channel correlation $\gamma_{i,j}$ represents the correlation between channel vectors $z_i$ and $z_j$ for a given pair of access terminals i and j. As discussed above, the pair-wise channel correlation $\gamma_{i,j}$ between channel vectors $z_i$ and $z_j$ is as follows:

$$\gamma_{i,j} \triangleq \frac{|z_i^* z_j|}{\|z_i\|_2 \|z_j\|_2}.$$

where $z_i$ and $z_j$ are written as column vectors, $|\cdot|$ denotes the magnitude of a complex number, * denotes the complex conjugate transpose, and $\|\cdot\|_2$ denotes the 2-norm of a complex vector.

At step 404, access terminals i* and j* are identified that provide the maximum pair-wise channel correlation $\gamma_{max}$, i.e., $\gamma_{i^*,j^*} = \gamma_{max}$.

At step 406, it is determined whether the maximum pair-wise channel correlation $\gamma_{max}$ satisfies (e.g., is less than, or is less than or equal to) a correlation threshold $\gamma_h$, where $\gamma_h > 0$. The correlation threshold $\gamma_h$ may be any predefined value, such as, e.g., 20%. At step 408, if the maximum pair-wise channel correlation $\gamma_{max}$ satisfies the correlation threshold $\gamma_h$ (i.e., $\gamma_{max} \leq \gamma_h$), method 400 ends.

At step 410, if the maximum pair-wise channel correlation $\gamma_{max}$ does not satisfy the correlation threshold $\gamma_h$ (i.e., $\gamma_{max} > \gamma_h$), one of access terminals i* or j* is selected to be dropped from the population of access terminals based on their pair-wise channel correlation with the rest of the access terminals in the population of access terminals. In one embodiment, the access terminal i* or j* that is dropped is the access terminal that has the higher correlation with the rest of the access terminals in the population of access terminals. Thus, if $\max_{k \neq j^*}\{\gamma_{i^*,k}\} > \max_{k \neq i^*}\{\gamma_{j^*,k}\}$, indicating that access terminal i* has a higher maximum correlation with the remaining access terminals than access terminal j*, then at step 414, access terminal i* is dropped from the population of access terminals. Otherwise, at step 412, access terminal j* is dropped from the population of access terminals. Dropping the selected one of access terminals i* or j* may comprise reallocating the selected access terminal to a different resource (e.g., a different coherence time slot or frequency).

At step 416, the pair-wise channel correlation $\gamma_{i^*,j^*}$ between access terminals i* and j* is set to zero and the method 400 returns to step 404. Method 400 repeats until the maximum pair-wise channel correlation $\gamma_{max}$ satisfies the correlation threshold $\gamma_h$.

In one embodiment, instead of repeating method 400 until the maximum pair-wise channel correlation $\gamma_{max}$ satisfies the correlation threshold $\gamma_h$, process 400 is repeated for a predetermined number of intervals or iterations (e.g., 3 intervals). Thus, in this embodiment, at step 406, a variable representing the current interval is compared with a variable representing the maximum predetermined number of intervals. If the variable representing the current interval satisfies (e.g., is greater than, or is equal to) the variable representing the maximum predetermined number of intervals, method 400 ends at step 408. Otherwise method 400 proceeds to step 410. At step 416, the variable representing the current interval is incremented.

It has been found that the above-described method for selecting one or more access terminals to drop from service from the population of access terminals achieves substantially the same performance as the conventional exhaustive search.

An example will now be described to illustrate the performance of a communications system by selectively dropping one or more access terminals. In a macro-cellular Massive MIMO base station in a suburban area with a radius of 2 kilometers, the base station is equipped with 256 service antennas. The total available downlink radiated power is 10 watts. Each access terminal has a transmit power of 200 milliwatts. The base station serves 18 access terminals. The carrier frequency is 1.0 GHz.

The performance of the communications system by selectively dropping one or more access terminals is summarized in Tables 2 and 3 below. Compared with the baseline, the 95% likely SINRs (i.e., the fifth percentile) increase significantly in all cases. There was only a 5% chance that 2 or more users are dropped and a 50% chance that at most 1 user is dropped. Once a small number of access terminals are dropped, the remaining LOS channel vectors are nearly mutually orthogonal. Thus, for Massive MIMO to perform well in LOS conditions, it is sufficient to selectively drop a small number of access terminals from service.

TABLE 2

Maximum Ratio Process
Maximum Ratio Processing

| | | Baseline | $\gamma_h = 0.1$ | $\gamma_h = 0.2$ | $\gamma_h = 0.3$ | $\gamma_h = 0.4$ | $\gamma_h = 0.5$ |
|---|---|---|---|---|---|---|---|
| Downlink per user SINR (db) | 5%-ile | −0.0705 | 8.0019 | 7.2335 | 5.9115 | 4.5067 | 3.4658 |
| | 50%-ile | 5.0810 | 8.4527 | 8.4109 | 8.3517 | 8.3187 | 8.2638 |
| Uplink per user SINR (db) | 5%-ile | −1.4298 | 3.2977 | 2.7130 | 2.0796 | 1.4030 | 0.8445 |
| | 50%-ile | 1.6832 | 3.7359 | 3.7281 | 3.6563 | 3.6337 | 3.6018 |
| Number of users dropped | 5%-ile | 0 | 1 | 1 | 1 | 0 | 0 |
| | 50%-ile | 0 | 2 | 2 | 2 | 2 | 2 |

TABLE 3

Zero-Forcing Processing
Maximum Ratio Processing

| | | Baseline | $\gamma_h = 0.1$ | $\gamma_h = 0.2$ | $\gamma_h = 0.3$ | $\gamma_h = 0.4$ | $\gamma_h = 0.5$ |
|---|---|---|---|---|---|---|---|
| Downlink per user SINR (db) | 5%-ile | −5.6527 | 8.4687 | 8.4518 | 8.3823 | 8.2977 | 8.1274 |
| | 50%-ile | 8.3027 | 8.7373 | 8.7183 | 8.5294 | 8.5152 | 8.5073 |
| Uplink per user SINR (db) | 5%-ile | −19.4126 | 3.7218 | 3.3822 | 2.8995 | 2.2343 | 1.4683 |
| | 50%-ile | 2.5637 | 3.9386 | 3.9321 | 3.9022 | 3.8911 | 3.8763 |
| Number of users dropped | 5%-ile | 0 | 1 | 1 | 1 | 0 | 0 |
| | 50%-ile | 0 | 2 | 2 | 2 | 2 | 2 |

Figure 5:
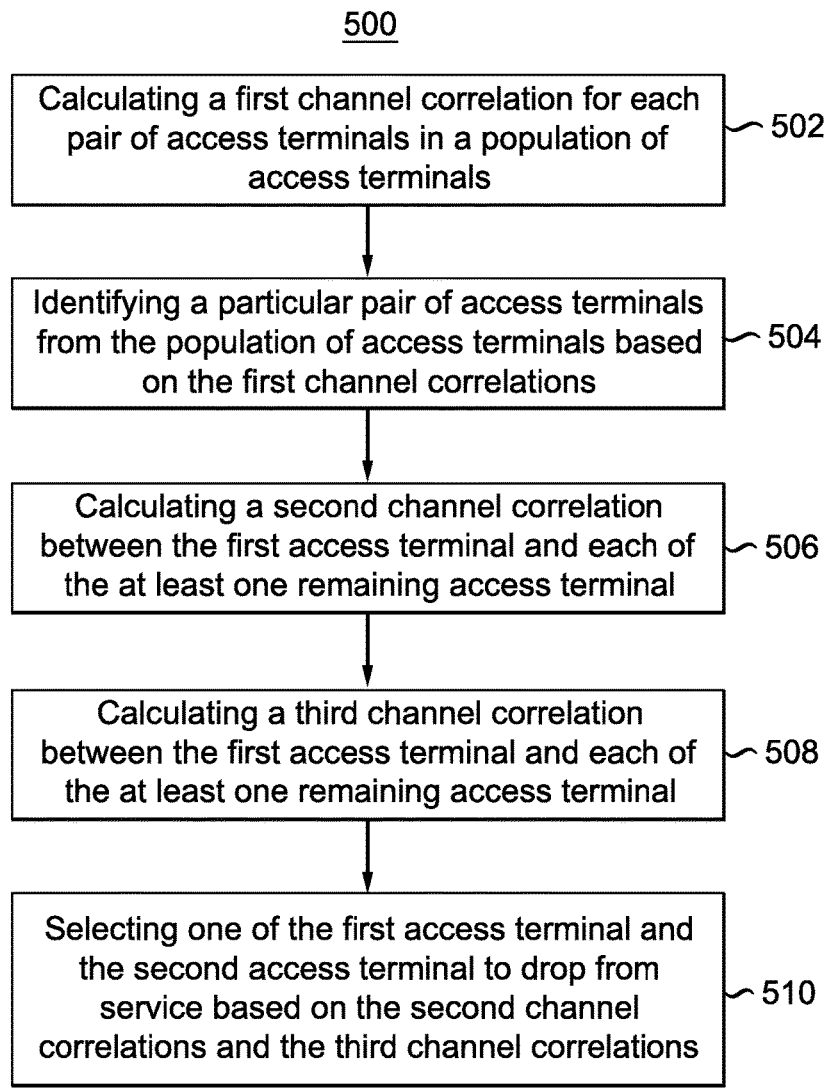
FIG. 5 shows a flow diagram of another method for selecting one or more access terminals to drop from service from a population of access terminals, in accordance with one embodiment.
Figure 6:
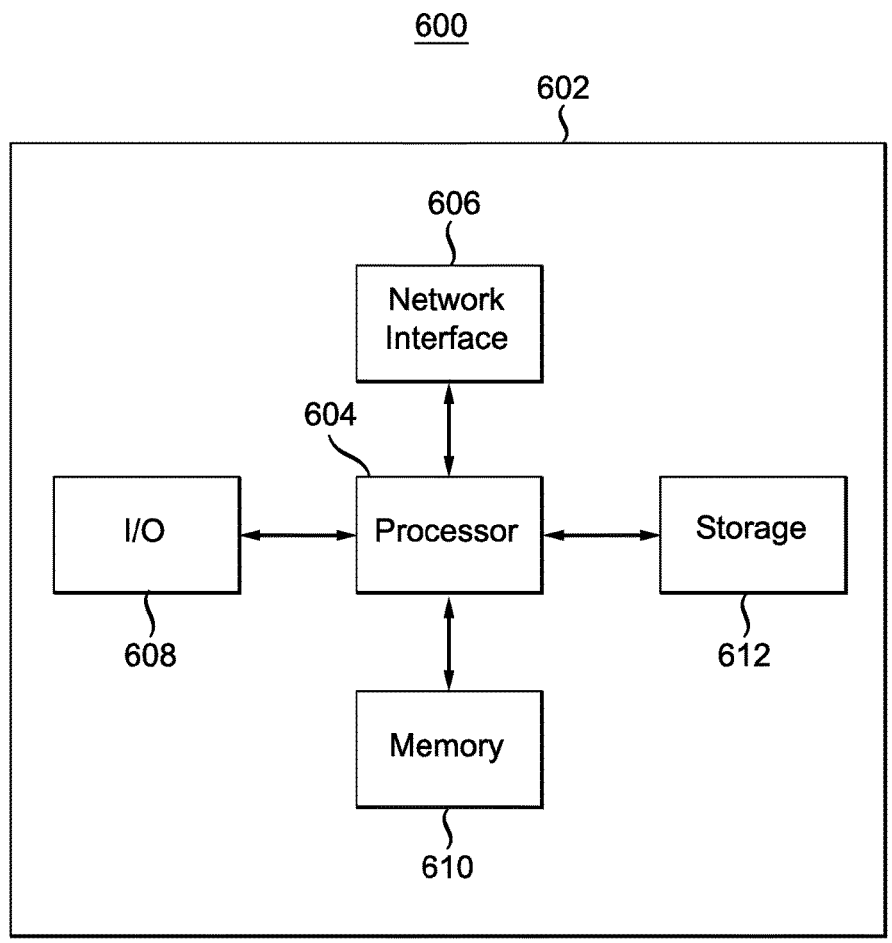
FIG. 6 shows a high-level block diagram of a computer, which may be implemented for selecting one or more access terminals to drop from service from a population of access terminals, in accordance with one embodiment.

FIG. 5 shows a method 500 for selecting one or more access terminals to drop from service from a population of access terminals, in accordance with one or more embodiments. Method 500 will be described with reference to FIG. 1. Method 500 may be performed by any computing device communicatively coupled to base station 102. For example, in one embodiment, method 500 may be performed by a computing device (e.g., as shown in FIG. 6) implemented at base station 102. In another embodiment, method 500 may be performed by a computing device implemented at hub node 108 connected to base station 102 via backhaul network 110.

At step 502, a first channel correlation $\gamma_{i,j}$ is calculated for each pair of access terminals in a population of access terminals. For example, the first channel correlation is calculated between each access terminal in the population of access terminals and each other access terminal in the population of access terminals. The channel correlation represents the pair-wise correlation between channel vectors $z_i$ and $z_j$ for a given pair of access terminals i and j.

At step 504, a particular pair of access terminals is identified from the population of access terminals based on the first channel correlations. The population of access terminals includes a first access terminal of the particular pair of access terminals, a second access terminal of the particular pair of access terminals, and at least one remaining access terminal from the population of access terminals. In one embodiment, the particular pair of access terminals is identified as the access terminals i* and j* having a highest correlation of the first channel correlations.

At step 506, a second channel correlation is calculated between the first access terminal and each of the at least one remaining access terminal. At step 508, a third channel correlation is calculated between the second access terminal and each of the at least one remaining access terminal. At step 510, one of the first access terminal and the second access terminal is dropped from service from the population of access terminals based on the second channel correlations and the third channel correlations. In one embodiment, if a maximum correlation of the second channel correlations is greater than a maximum correlation of the third channel correlations (i.e., the first access terminal has a higher correlation with the remaining access terminals than the second access terminal), the first access terminal is dropped. Otherwise, if the maximum correlation of the third channel correlations is greater than a maximum correlation of the second channel correlations (i.e., the second access terminal has a higher correlation with the remaining access terminals than the first access terminal), the second access terminal is dropped. Dropping the selected one of the first and second access terminals may comprise reallocating the selected access terminal to a different resource (e.g., a different coherence time slot or frequency).

In one embodiment, the steps of method 500 are repeated until a maximum correlation of the first channel correlations satisfies (e.g., is less than, or is less than or equal to) a correlation threshold. For example, after selecting one of the first access terminal and the second access terminal to drop from the population of access terminals, the channel correlation between the first and second access terminals is removed (e.g., set to zero) from the first channel correlations and the method repeats steps 504, 506, 508, and 510 until the maximum correlation of the first channel correlations satisfies the correlation threshold.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 4 and 5. Certain steps of the methods described herein, including one or more of the steps of FIGS. 4 and 5, may be performed by a server or by another processor in a network-based cloud-computing system. Certain steps of the methods described herein, including one or more of the steps of FIGS. 4 and 5, may be performed by a client computer in a network-based cloud computing system. The steps of the methods described herein, including one or more of the steps of FIGS. 4 and 5, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 4 and 5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

A high-level block diagram 600 of an example computer that may be used to implement systems, apparatus, and methods described herein is depicted in FIG. 6. Computer 602 includes a processor 604 operatively coupled to a data storage device 612 and a memory 610. Processor 604 controls the overall operation of computer 602 by executing computer program instructions that define such operations. The computer program instructions may be stored in data storage device 612, or other computer readable medium, and loaded into memory 610 when execution of the computer program instructions is desired. Thus, the method steps of FIGS. 4 and 5 can be defined by the computer program instructions stored in memory 610 and/or data storage device 612 and controlled by processor 604 executing the computer program instructions. For example, the computer program instructions can be implemented as computer executable code programmed by one skilled in the art to perform the method steps of FIGS. 4 and 5. Accordingly, by executing the computer program instructions, the processor 604 executes the method steps of FIGS. 4 and 5. Computer 602 may also include one or more network interfaces 606 for communicating with other devices via a network. Computer 602 may also include one or more input/output devices 608 that enable user interaction with computer 602 (e.g., display, keyboard, mouse, speakers, buttons, etc.).

Processor 604 may include both general and special purpose microprocessors, and may be the sole processor or one of multiple processors of computer 602. Processor 604 may include one or more central processing units (CPUs), for example. Processor 604, data storage device 612, and/or memory 610 may include, be supplemented by, or incorporated in, one or more application-specific integrated circuits (ASICs) and/or one or more field programmable gate arrays (FPGAs).

Data storage device 612 and memory 610 each include a tangible non-transitory computer readable storage medium. Data storage device 612, and memory 610, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 608 may include peripherals, such as a printer, scanner, display screen, etc. For example, input/output devices 608 may include a display device such as a cathode ray tube (CRT) or liquid crystal display (LCD) monitor for displaying information to the user, a keyboard, and a pointing device such as a mouse or a trackball by which the user can provide input to computer 602.

Any or all of the systems and apparatus discussed herein, including elements of communications system 100 of FIG. 1, may be implemented using one or more computers such as computer 602.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the described invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
calculating a first channel correlation for each pair of access terminals in a population of access terminals;
identifying a particular pair of access terminals from the population of access terminals based on the first channel correlations, the population of access terminals comprising a first access terminal of the particular pair of access terminals, a second access terminal of the particular pair of access terminals, and at least one remaining access terminal from the population of access terminals;
calculating a second channel correlation between the first access terminal and each of the at least one remaining access terminal;
calculating a third channel correlation between the second access terminal and each of the at least one remaining access terminal; and
selecting one of the first access terminal and the second access terminal to drop from service based on the second channel correlations and the third channel correlations.

2. The method of claim 1, further comprising:
in response to the selecting, removing the respective correlation for the particular pair of access terminals from the first channel correlations to provide updated first channel correlations; and
repeating the identifying, the calculating the second channel correlation, the calculating the third channel correlation, the selecting, and the removing for the updated first channel correlations until a maximum correlation of the updated first channel correlations satisfies a threshold.

3. The method of claim 1, wherein selecting one of the first access terminal and the second access terminal to drop from service comprises:
selecting the first access terminal where a maximum correlation of the second channel correlations is greater than a maximum correlation of the third channel correlations.

4. The method of claim 1, wherein selecting one of the first access terminal and the second access terminal to drop from service comprises:
selecting the second access terminal where a maximum correlation of the third channel correlations is greater than a maximum correlation of the second channel correlations.

5. The method of claim 1, wherein identifying the particular pair of access terminals from the population of access terminals based on the first channel correlations comprises:
identifying the particular pair of access terminals from the population of access terminals as having a highest correlation of the first channel correlations.

6. The method of claim 1, wherein calculating the first channel correlation for each pair of access terminals in the population of access terminals comprises:
for each respective access terminal in the population of access terminals, calculating the first channel correlation between the respective access terminal and each other access terminal in the population of access terminals.

7. The method of claim 1, wherein the first channel correlations comprise correlations between channel vectors associated with access terminals in each pair of access terminals.

8. The method of claim 1, further comprising:
dropping the selected one of the first access terminal and the second access terminal from service from the population of access terminals.

9. The method of claim 8, wherein dropping the selected one of the first access terminal and the second access terminal from service from the population of access terminals comprises:
reallocating the selected one of the first access terminal and the second access terminal to a different coherence time slot.

10. An apparatus comprising:
a processor; and
a memory to store computer program instructions, the computer program instructions when executed on the processor cause the processor to perform operations comprising:
calculating a first channel correlation for each pair of access terminals in a population of access terminals;
identifying a particular pair of access terminals from the population of access terminals based on the first channel correlations, the population of access terminals comprising a first access terminal of the particular pair of access terminals, a second access terminal of the particular pair of access terminals, and at least one remaining access terminal from the population of access terminals;
calculating a second channel correlation between the first access terminal and each of the at least one remaining access terminal;
calculating a third channel correlation between the second access terminal and each of the at least one remaining access terminal; and
selecting one of the first access terminal and the second access terminal to drop from service based on the second channel correlations and the third channel correlations.

11. The apparatus of claim 10, the operations further comprising:
in response to the selecting, removing the respective correlation for the particular pair of access terminals from the first channel correlations to provide updated first channel correlations; and
repeating the identifying, the calculating the second channel correlation, the calculating the third channel correlation, the selecting, and the removing for the updated first channel correlations until a maximum correlation of the updated first channel correlations satisfies a threshold.

12. The apparatus of claim 10, wherein selecting one of the first access terminal and the second access terminal to drop from service comprises:
selecting the first access terminal where a maximum correlation of the second channel correlations is greater than a maximum correlation of the third channel correlations.

13. The apparatus of claim 10, wherein selecting one of the first access terminal and the second access terminal to drop from service comprises:
selecting the second access terminal where a maximum correlation of the third channel correlations is greater than a maximum correlation of the second channel correlations.

14. The apparatus of claim 10, wherein the first channel correlations comprise correlations between channel vectors associated with access terminals in each pair of access terminals.

15. A non-transitory computer readable medium storing computer program instructions, which, when executed on a processor, cause the processor to perform operations comprising:
calculating a first channel correlation for each pair of access terminals in a population of access terminals;
identifying a particular pair of access terminals from the population of access terminals based on the first channel correlations, the population of access terminals comprising a first access terminal of the particular pair of access terminals, a second access terminal of the particular pair of access terminals, and at least one remaining access terminal from the population of access terminals;
calculating a second channel correlation between the first access terminal and each of the at least one remaining access terminal;
calculating a third channel correlation between the second access terminal and each of the at least one remaining access terminal; and
selecting one of the first access terminal and the second access terminal to drop from service based on the second channel correlations and the third channel correlations.

16. The non-transitory computer readable medium of claim 15, the operations further comprising:
in response to the selecting, removing the respective correlation for the particular pair of access terminals from the first channel correlations to provide updated first channel correlations; and
repeating the identifying, the calculating the second channel correlation, the calculating the third channel correlation, the selecting, and the removing for the updated first channel correlations until a maximum correlation of the updated first channel correlations satisfies a threshold.

17. The non-transitory computer readable medium of claim 15, wherein identifying the particular pair of access terminals from the population of access terminals based on the first channel correlations comprises:
identifying the particular pair of access terminals from the population of access terminals as having a highest correlation of the first channel correlations.

18. The non-transitory computer readable medium of claim 15, wherein calculating the first channel correlation for each pair of access terminals in the population of access terminals comprises:
for each respective access terminal in the population of access terminals, calculating the first channel correlation between the respective access terminal and each other access terminal in the population of access terminals.

19. The non-transitory computer readable medium of claim 15, the operations further comprising:
dropping the selected one of the first access terminal and the second access terminal from service from the population of access terminals.

20. The non-transitory computer readable medium of claim 19, wherein dropping the selected one of the first access terminal and the second access terminal from service from the population of access terminals comprises:

reallocating the selected one of the first access terminal and the second access terminal to a different coherence time slot.

\* \* \* \* \*